Figure 3:
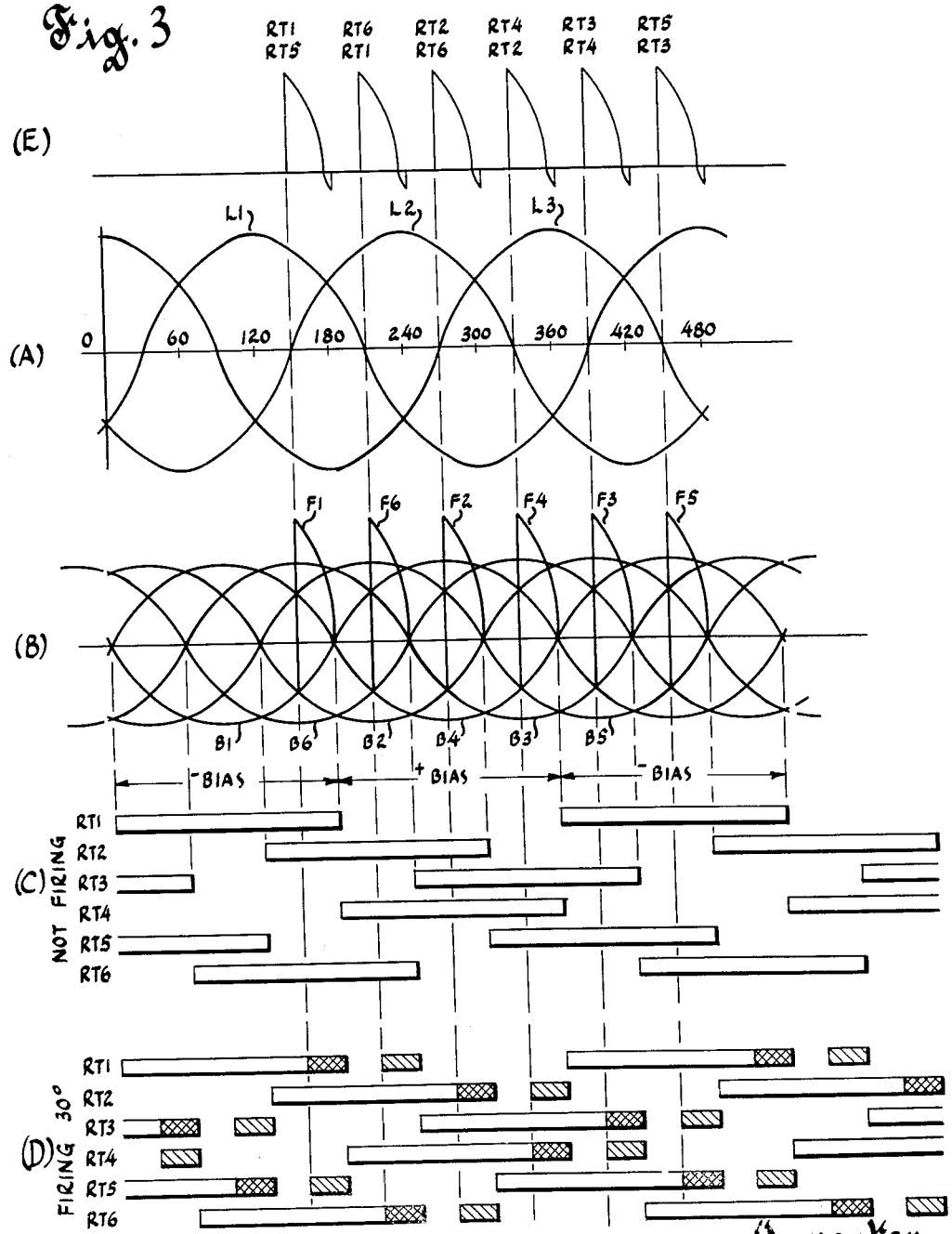

May 30, 1961
P. M. FISCHER
2,986,692
ELECTRICAL CONTROL SYSTEMS
Filed July 9, 1958
3 Sheets-Sheet 1
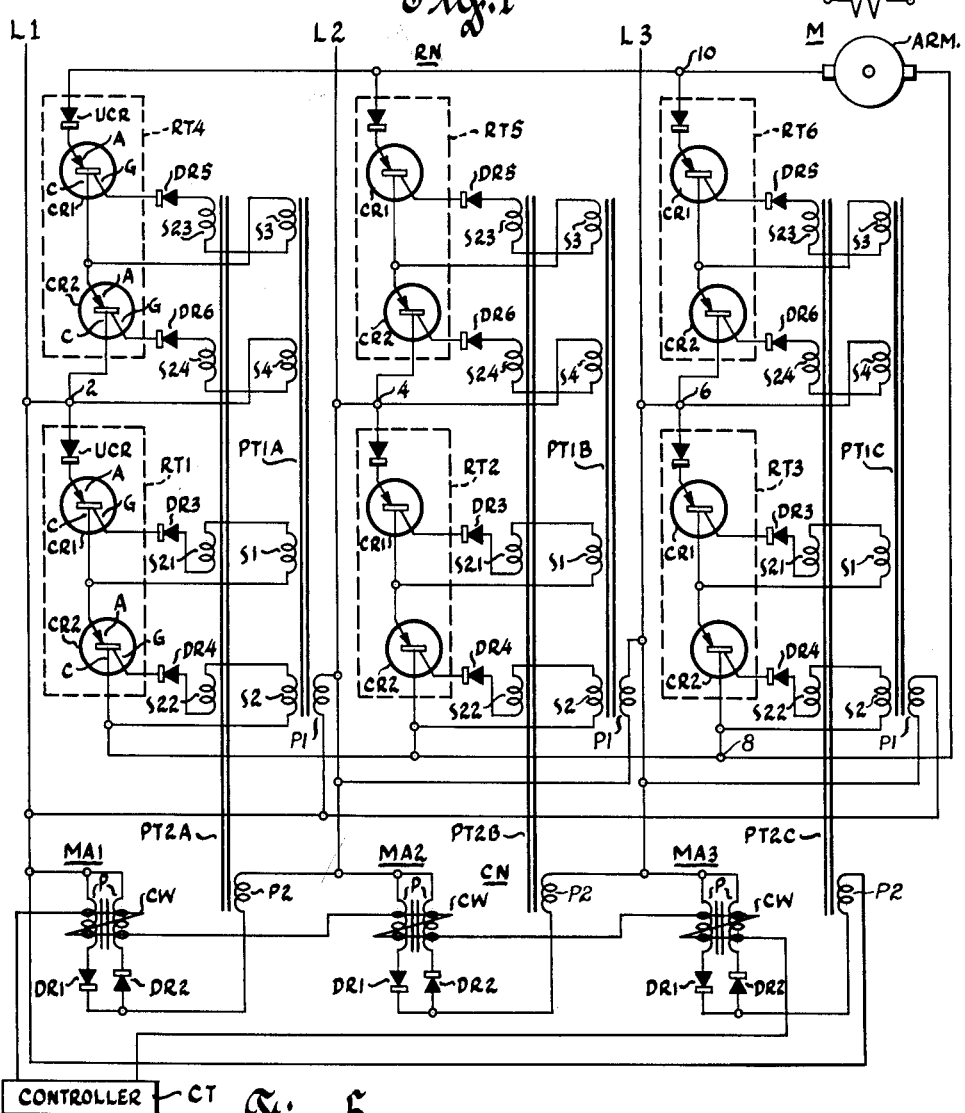
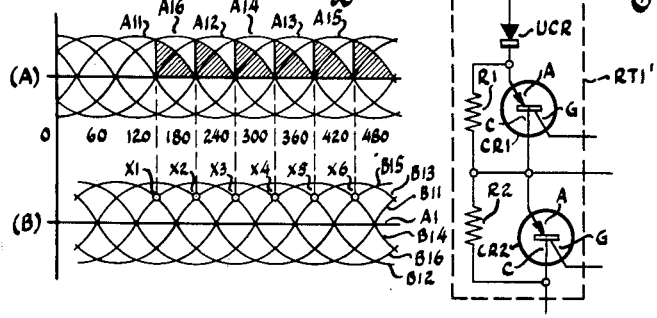
Inventor
Paul M. Fischer
By H R Rather
Attorney

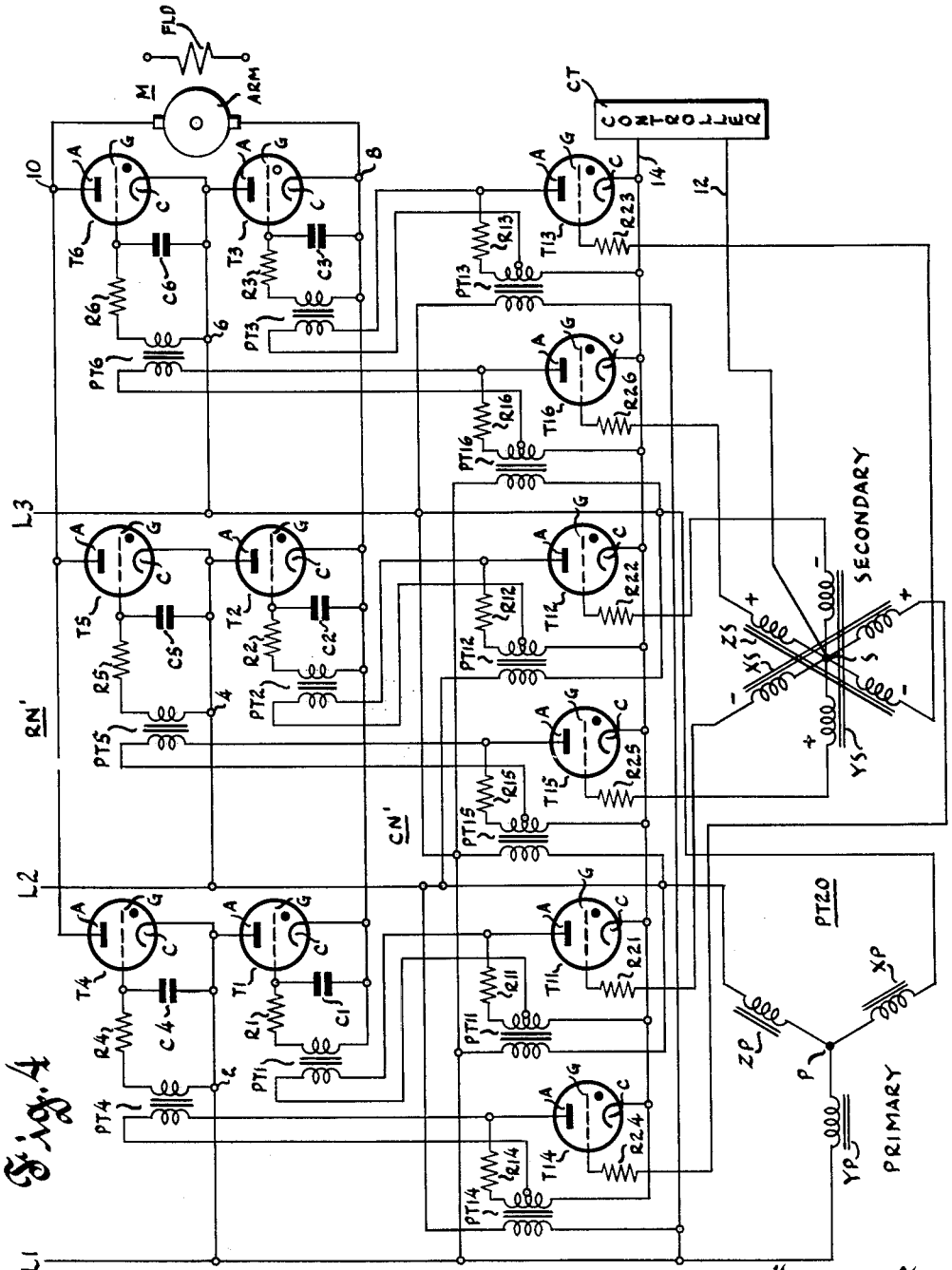

United States Patent Office 2,986,692
Patented May 30, 1961

2,986,692

ELECTRICAL CONTROL SYSTEMS

Paul M. Fischer, Milwaukee, Wis., assignor to Cutler-Hammer, Inc., Milwaukee, Wis., a corporation of Delaware Filed July 9, 1958, Ser. No. 747,473

21 Claims. (Cl. 321—40)

This invention relates to electrical control systems for transferring energy between alternating current and direct current networks.

While not limited thereto, the invention is especially applicable to systems for supplying and controlling power from a plural phase alternating current power supply source to the armature winding of a direct current motor.

Paul M. Fischer copending application Ser. No. 685,599, filed September 23, 1957, now Patent No. 2,929,979 dated March 22, 1960, and assigned to the assignee of the present invention, discloses rectifier systems and control means therefor for supplying a direct current motor. The present invention relates to improved rectifier systems and to novel control means therefor.

A general object of the invention is to provide improved means for supplying and adjustably controlling power from a plural phase alternating current power supply source to a direct current load.

A more specific object of the invention is to provide improved means for controlling operation of controllable unidirectional current conducting devices connected in a full wave rectifier network between a plural phase source and a direct current load.

Another specific object of the invention is to provide such rectifier network with improved means affording a novel order of conduction of the unidirectional conducting devices.

Another specific object of the invention is to provide such rectifier network with improved control means for positively insuring conduction of the unidirectional conducting devices in a predetermined repetitively sequential order and to prevent misconduction thereof.

Another object of the invention is to provide such improved control means affording conduction of each unidirectional conducting device in said network twice in the aforementioned sequence during each cycle of the alternating current source.

Another object of the invention is to provide extremely simplified circuits capable of efficient and accurate operation for accomplishing the aforementioned objects.

Other objects and advantages of the invention will hereinafter appear.

While the apparatus hereinafter described is effectively adapted to fulfill the objects stated, it is to be understood that I do not intend to confine my invention to the particular preferred embodiments of control systems disclosed, inasmuch as they are susceptible of various modifications without departing from the scope of the appended claims.

The invention will now be described with reference to the accompanying drawings, wherein:

Figure 1 diagrammatically shows a motor control system constructed in accordance with the present invention;

Fig. 2 is a fragmentary circuit diagram showing a modification of the system of Fig. 1;

Fig. 3 graphically depicts the operating characteristics of the invention;

Fig. 4 diagrammatically shows a modification of the invention; and

Fig. 5 graphically depicts operating characteristics of the system of Fig. 4.

Referring to Fig. 1, the character M designates an electrical motor of the direct current shunt wound type or the like having an armature ARM and a field winding FLD. Field winding FLD may be energized from a suitable direct current power supply source in a well known manner. A bridge or full wave rectifier network RN is provided for supplying full wave rectified alternating current power from a three-phase power supply source to the winding of armature ARM of motor M. There is also provided a control network CN including therein a controller CT for controlling network RN. Controller CT may be similar to the speed control network and its associated circuits shown and described in the aforementioned copending application Serial No. 685,599, and the details thereof have not been shown herein to avoid complicating the drawings.

Rectifier network RN is provided with input terminals 2, 4 and 6 connectable through power supply lines L1, L2 and L3, respectively, to a three-phase alternating current power supply source (not shown) and output terminals 8 and 10 connected across armature ARM. While armature ARM is shown directly connected to output terminals 8 and 10, it will be apparent that motor starting and reversing circuits may be interposed therebetween as shown in the aforementioned copending application, Serial No. 685,599. Network RN is provided with a lower horizontal row of rectifier units RT1, RT2 and RT3 and an upper horizontal row of rectifier units RT4, RT5 and RT6. Each rectifier unit RT1, RT2 and RT3 in the lower horizontal row is connected at one end thereof to a respectively associated input terminal 2, 4 and 6 and at the other end to output terminal 8. Each rectifier unit RT4, RT5 and RT6 in the upper horizontal row is connected at one end to output terminal 10 and at the other end thereof to a respectively associated input terminal 2, 4 and 6. Rectifier units RT1, RT2 and RT3 are poled to conduct in the direction from input terminals 2, 4 and 6 to output terminal 8 while rectifier units RT4, RT5 and RT6 are poled to conduct in the direction from output terminal 10 to input terminals 2, 4 and 6. As will be apparent, the aforementioned connections of the rectifier units form a three-phase full-wave rectifier bridge between input terminals and the output terminals. It will also be apparent that a network employing four rectifier units for single phase operation or a network employing eight rectifier units for two-phase operation could as well be employed in place of the three-phase bridge shown.

Each rectifier unit RT1–6 is provided with an uncontrolled rectifier UCR and two "controlled rectifiers" CR1 and CR2 in series connection. Uncontrolled rectifier UCR may be a well known diode of the solid element type or the like. Each controlled rectifier CR1 and CR2 is a triode of the silicon solid element type or the like, having an anode A, a cathode C and a control electrode or gate G. The anodes and cathodes of the controlled rectifiers are connected in the aforementioned series connection and the gates are connected to control network CN whereby the latter controls the gate current and consequently the anode-to-cathode conduction as hereinafter described.

Control network CN is provided with three bias transformers PT1A, PT1B and PT1C each having a primary winding P1 and four secondary windings S1, S2, S3 and S4. Network CN is also provided with three control transformers PT2A, PT2B and PT2C each having a primary winding P2 and four secondary windings S21, S22, S23 and S24. Network CN is further provided with three amplifiers MA1, MA2 and MA3 of the magnetic saturable reactor type or the like each having a pair of power windings P and a control winding CW wound on a magnetic iron core. The power windings P of each amplifier MA1, MA2 and MA3 have connected in series therewith oppositely poled self-saturating half-wave rectifiers DR1 and DR2, respectively, and the oppositely conducting series circuits thus provided are connected in parallel with one another. Control windings CW of amplifiers MA1, MA2 and MA3 are connected in series to controller CT.

Primary windings P1 of bias transformers PT1A, PT1B and PT1C are connected across power supply lines L1 and L2, L2 and L3, and L3 and L1, respectively, for energization by the three phases of the power supply source. Primary windings P2 of control transformers PT2A, PT2B and PT2C are connected respectively in series with the parallel connected power windings P and associated self-saturating rectifiers DR1 and DR2 of amplifiers MA1, MA2 and MA3 across power supply lines L1 and L2, L2 and L3, and L3 and L1, respectively.

Secondary windings S1 and S2 of bias transformer PT1A and secondary windings S21 and S22 of control transformer PT2A are connected to control conduction of controlled rectifiers CR1 and CR2 in rectifier unit RT1. Secondary windings S3 and S4 of bias transformer PT1A and secondary windings S23 and S24 of control transformer PT2A are connected to control conduction of controlled rectifiers CR1 and CR2 in rectifier unit RT4. To this end, secondary windings S1 and S21 are connected in series with a half-wave rectifier DR3 between cathode C and gate G of controlled rectifier CR1 in rectifier unit RT1 and secondary windings S2 and S22 are connected in series with a half-wave rectifier DR4 between cathode C and gate G of controlled rectifier CR2 in rectifier unit RT1. Also, secondary windings S3 and S23 are connected in series with a half-wave rectifier DR5 between cathode C and gate G of controlled rectifier CR1 in rectifier unit RT4, and secondary windings S4 and S24 are connected in series with a half-wave rectifier DR6 between cathode C and gate G of controlled rectifier CR2 in rectifier unit RT4. The two pairs of secondary windings S1 and S2 of bias transformer PT1A and S21 and S22 of control transformer PT2A are connected in the cathode-to-gate circuits of rectifier unit RT1 in one direction and the two pairs of secondary windings S3 and S4 of bias transformer PT1A and S23 and S24 of control transformer PT2A are connected in the cathode-to-gate circuits of rectifier unit RT4 in the opposite direction. As a result, whenever gates G of controlled rectifiers CR1 and CR2 in rectifier unit RT1 are biased positive, gates G of controlled rectifiers CR1 and CR2 in rectifier unit RT4 are simultaneously biased negative and vice versa.

The secondary windings of bias transformer PT1B and control transformer PT2B are similarly connected through half-wave rectifiers in the cathode-to-gate circuits of controlled rectifiers CR1 and CR2 in rectifier units RT2 and RT5. And the secondary windings of bias transformer PT1C and control transformer PT2C are connected in the hereinbefore described manner through half-wave rectifiers in the cathode-to-gate circuits of controlled rectifiers CR1 and CR2 in rectifier units RT3 and RT6.

While a single uncontrolled rectifier UCR and two controlled rectifiers CR1 and CR2 have been shown in each rectifier unit RT1–RT6, it will be apparent that any desired number of uncontrolled and controlled rectifiers for higher or lower voltage ratings may be employed in place thereof, the minimum being one controlled rectifier only in each rectifier unit or leg of network RN.

The operation of the system of Fig. 1 will now be described with reference to the operating characteristics graphically depicted in Fig. 3. In Fig. 3, waves (A) represent the three phases of the power supply voltage applied through lines L1, L2 and L3 to input terminals 2, 4 and 6 of rectifier network RN. Waves (B) represent the bias voltages B1–B6 applied to gates G in rectifier units RT1–RT6, respectively, through bias transformers PT1A, PT1B and PT1C, and the firing pulses F1–F6 applied to gates G in rectifier units RT1–RT6 for one complete firing cycle. Fig. 3(C) is a simplified representation of the alternate negative (rectangle) and positive (space) bias voltages applied to gates G in rectifier units RT1–RT6 in overlapped time relation for each period of 180 electrical degrees with the rectifiers not firing. Fig. 3(D) is a simplified representation similar to Fig. 3(C) and additionally including a representation of 30 degree firing sequence of rectifier units RT1–RT6. The waves in Fig. 3(E) represent the rectifier output voltage applied from output terminals 8 and 10 of network RN across armature ARM of motor M.

Let it be assumed that lines L1, L2 and L3 are connected to a suitable three-phase alternating current power supply source. As a result, a three-phase voltage with the phase sequence shown in Fig. 3(A) is applied to input terminals 2, 4 and 6 of rectifier network RN. During the 180 electrical degree period (0–180°) when line L1 is positive relative to line L2, gates G in rectifier unit RT1 are biased negative through secondary windings S1 and S2 of bias transformer PT1A as shown in Figs. 3(B) and (C). Thus normal power flow from line L1 through rectifier unit RT1, load M, and rectifier unit RT5 to line L2 is blocked. During the 180 electrical degree period (60–240°) when line L1 is positive relative to line L3, gates G in rectifier unit RT6 are biased negative through secondary windings S3 and S4 of bias transformer PT1C. Thus normal power flow from line L1 through rectifier unit RT1, load M and rectifier unit RT6 to line L3 is blocked. It should be noted that the two 180 electrical degree periods hereinbefore described overlap so that only 240 electrical degrees out of 360° have been considered. During the remaining 120 degrees (240–360°) line L1 is negative to both line L2 and L3 so that there is no tendency for power flow from line L1. Similarly during the 180 electrical degree period (120 to 300°) when line L2 is positive relative to line L3, gates G in rectifier unit RT2 are biased negative through secondary windings S1 and S2 to bias transformer PT1B. Thus normal power flow from line L2 through rectifier unit RT2, load M and rectifier unit RT6 is blocked. During the 180 electrical degree period (180 to 360°) when line L2 is positive relative to line L1, gates G in rectifier unit PT4 are biased negative through secondary windings S3 and S4 of bias transformer PT1A. Thus normal power flow from line L2 through rectifier unit RT2, load M and rectifier unit RT4 to line L1 is blocked. Again the preceding two periods overlap so that only 240 degrees are taken care of but again during the remaining 120 degrees left to be accounted for the line under discussion, this time line L2, is negative with respect to line L3 and line L1 so that there is no tendency for current to flow from line L2.

Because the circuit is symmetrical, the same conditions hold true for line L3 with respect to lines L1 and L2. Reference to Fig. 3(A) will show that all the electrical periods hereinbefore described overlap and add up to only 480 electrical degrees. Actually, of course, one complete period is 360° but the description was extended into the second 360° period to emphasize that without any further signal voltages rectifier RN blocks all current flow from lines L1, L2 and L3 to load M.

Controlled conduction of network RN is afforded by control transformers PT2A, PT2B and PT2C, the latter being under the control of magnetic amplifiers MA1, MA2 and MA3 connected respectively in series therewith and controller CT. Controller CT may comprise any suitable source of direct current potential which may be adjustably applied to energize control windings CW of the aforementioned magnetic amplifiers. The speed control network disclosed in the aforementioned copending application Serial No. 685,599 may readily be employed for this purpose.

Let it be assumed that controller CT is operated to energize control windings CW in series with a suitable direct current to drive amplifiers MA1, MA2 and MA3 "on." The inductance of power windings P of the magnetic amplifiers affords a phase shift of the alternating currents flowing thereto relative to the line voltage applied to input terminals 2, 4 and 6 of network RN of approximately 90 degrees. The magnetic amplifiers function similarly to electric discharge devices of the thyratron type to provide firing pulses through control transformers PT2A, PPT2B and PT2C to gates G in network RN. The input to each magnetic amplifier comprises a phase shifted alternating current from lines L1, L2 and L3 to power windings P and a direct current from controller C to control windings CW. These combined inputs to amplifiers MA1, MA2 and MA3 effect operation thereof to provide output firing pulses F1, F6, F2, F4, F3 and F5 as shown in Fig. 3(B) each having a steep wave front. As will be apparent, such firing pulses are applied through the associated control transformers to gates G in rectifier units RT1–6 during the latter portion of the 180 electrical degree period when the controlled rectifiers in the respective rectifier units are biased negative.

For exemplary purposes, it may be assumed that control windings CW of the amplifiers are energized to a value whereby the latter provide an output pulse during the last thirty degrees of the negative bias period of each rectifier unit RT1–6. Referring to Figs. 3(B) and (C), it will be apparent that during the last thirty degrees of the negative bias period B1 of rectifier RT1, both rectifier units RT4 and RT5 are positively biased. Firing pulse F1 provided by amplifier MA1 through control transformer PT2A to gates G in rectifier unit RT1 render the latter conducting. Hence, rectifier unit RT1 will conduct with rectifier unit RT5 because rectifier unit RT4 is connected to the same line L1 as rectifier unit RT1 and line L1 has a positive voltage thereon. As a result current flows through armature ARM of motor M in a circuit extending from line L1 through input terminal 2, rectifier unit RT1, output terminal 8, armature ARM, output terminal 10, rectifier unit RT5 and input terminal 4 to line L2 to start the motor.

Referring to Fig. 3(D), the criss-cross hatched rectangles represent the forced conduction of each rectifier unit during its negative bias period and the cross hatched rectangles represent conduction of each rectifier unit during its positive bias period. Thus, the criss-cross and cross hatched rectangles in each vertical column indicate the pair of rectifier units which simultaneously conduct responsive to each firing pulse. As shown in Fig. 3(B), control network CN provides six firing pulses F1, F6, F2, F4, F3 and F5 in that order sequentially to rectifier units RT1, RT6, RT2, RT4, RT3 and RT5 during each cycle of the power supply voltage and this sequence is repeated for each succeeding cycle thereof. As a result, a repetitively sequential firing order of rectifier unit RT1 with RT5, RT6 with RT1, RT2 with RT6, RT4 with RT2, RT3 with RT4 and RT5 with RT3 is attained to energize armature ARM of motor M. The firing order of controlled rectifiers CR1 and CR2 in rectifier units RT1–6 is graphically depicted in Fig. 3(E). The resultant output from rectifier network RN to armature ARM of motor M is the pulse wave in Fig. 3(E).

To adjust the speed of motor M, controller CT is operated through a rheostat or the like to increase or decrease the energization of control windings CW of amplifiers MA1, MA2 and MA3. Increased energization of control windings CW effects advance of the steep wave front of firing pulses F1–6 thereby to correspondingly advance the firing points of rectifier units RT1–6 and to increase the armature voltage. Conversely, decreased energization of control windings CW effects retardation of the wave fronts of firing pulses F1–6 thereby to correspondingly retard the firing points of rectifier units RT1–6 and to decrease the armature voltage. Each pair of rectifier units RT1 and RT5, RT6 and RT1, etc., conducts from the firing point to the point of intersection of voltage waves L1 and L2, L1 and L3, etc., shown in Fig. 3(A). The area between the voltage waves from the firing point to the point of intersection thereof is indicative of the electrical energy applied to armature ARM. This area is increased or decreased by advancing or retarding the firing point of the controlled rectifiers. Hence, the speed of the motor may be selectively adjusted and controlled by controlling the energization of control windings CW.

The system shown in Fig. 1 may be modified in the manner shown in Fig. 2. In Fig. 2, the fragmentary circuit designated RT1' comprises a modified rectifier unit which may be substituted in place of each rectifier unit RT1–6 in Fig. 1. Rectifier unit RT1' is similar to rectifier units RT1–6 except that a resistor R1 is connected across anode A and cathode C of controlled rectifier CR1 and a resistor R2 is connected across anode A and cathode C of controlled rectifier CR2. Resistors R1 and R2 not only protect controlled rectifiers CR1 and CR2 from breakdown under the force of reverse current but also, and which is more important, they protect controlled rectifiers CR1 and CR2 during conduction in the forward direction thereof. Controlled rectifiers of the solid element type employed in the present invention may have varying conductive and impedance characteristics. As a result, these controlled rectifiers when connected in series in a power circuit as shown might divide the voltage applied thereacross unequally to a significant degree. Hence, the voltage across one series connected controlled rectifier might reach the critical or "breakover" voltage thereof, the latter being defined as a value of voltage applied across the anode and cathode causing "breakdown" or conduction in the absence of gate current. This would result in a total loss of control of the rectifier unit.

To prevent this, resistors R1 and R2 are connected across the anodes and cathodes of controlled rectifiers CR1 and CR2, respectively. Resistors R1 and R2 have relatively high ohmic values and, as will be apparent, they tend to divide equally the pre-firing voltage across each series connected controlled rectifier as well as series rectifiers in other legs of network RN so as not to exceed the breakdown voltage of one unit. The high ohmic values of resistors R1 and R2 restrict the current flow therethrough to a small value when the associated rectifiers are not conducting. When a gate current pulse is applied to fire the controlled rectifier, most of the current flows through the latter.

Resistors R1 and R2, therefore, operate to effect firing of both series connected controlled rectifiers simultaneously in response to a gate current pulse as well as to force balance of current in corresponding legs of rectifier network RN.

Referring to Fig. 4, there is shown a modified motor control system employing controlled electric discharge devices in its rectifier network and control network. While the system in Fig. 4 is structurally different from the system of Fig. 1, it operates in generally the same manner graphically shown in Fig. 3 as will hereinafter appear.

Referring to Fig. 4, there is shown a direct current motor M having an armature ARM and a field winding FLD, the latter being energizable from a suitable direct current power supply source (not shown). The system is also provided with a rectifier network RN' and a control network CN', the latter including a controller CT similar to controller CT of Fig. 1.

Rectifier network RN' is provided with input terminals 2, 4 and 6 connectable through power supply lines L1, L2 and L3, respectively, to a three-phase alternating current power supply source (not shown) and output terminals 8 and 10 connected across armature ARM. While armature ARM is shown directly connected to output terminals 8 and 10, it will be apparent that motor starting and reversing circuits may be interposed therein as shown in the aforementioned copending application Serial No. 685,599. Network RN' is provided with a lower horizontal row of triodes T1, T2 and T3 and an upper horizontal row of triodes T4, T5 and T6. Each triode T1–6 may be of the gas filled thyration type or the like having an anode A, a cathode C and a control electrode or grid G. Anodes A of triodes T1, T2 and T3 in the lower horizontal row are connected to input terminals 2, 4 and 6, respectively, and cathodes C thereof are connected to output terminal 8. Anode A of triodes T4, T5 and T6 in the upper horizontal row are connected to output terminal 10 and cathode C thereof are connected to input terminals 2, 4 and 6, respectively. Grids G of triodes T1–6 are connected to control network CN' as hereinafter more fully described. As will be apparent, the aforementioned connections of triodes T1–6 form a three-phase full-wave rectifier bridge between the input terminals and the output terminals.

Control network CN' is provided with six control triodes T11 through T16. Each control triode T11–16 may be of the gas filled thyratron type or the like having an anode A a cathode C and a control electrode or grid G. Control network CN' is also provided with grid voltage transformers PT1 through PT6 for supplying control voltages to grids G of triodes T1 through T6, respectively. Each transformer PT1–6 is provided with a primary winding and a secondary winding. The secondary windings of transformers PT1 through PT6 are connected at their upper ends through resistors R1 through R6, respectively, to grids G of triodes T1 through T6 and at their lower ends to cathodes C thereof. Filter capacitors C1 through C6 are connected between grids G and cathodes C of triodes T1 through T6, respectively. Network CN' is further provided with six transformers PT11 through PT16 each having a primary winding and a secondary winding for supplying bias voltages to triodes T1 through T6 and anode voltages to control triodes T11 through T16, respectively. The primary winding of transformer PT11 is connected from line L1 to line L2 and the primary winding of transformer PT14 is connected from line L2 to line L1 to supply bias voltages of opposite polarity to triodes T1 and T4. The primary winding of transformer PT12 is connected from line L2 to line L3 and the primary winding of transformer PT15 is connected from line L3 to line L2 to supply bias voltages of opposite polarity to triodes T2 and T5. The primary winding of transformer PT13 is connected from line L3 to line L1 and the primary winding of transformer PT16 is connected from line L1 to line L3 to supply bias voltages of opposite polarity to triodes T3 and T6. To this end, the secondary windings of transformers PT11 through PT16 are connected at their upper ends through resistors R11 through R16, respectively, to anodes A of control triodes T11 through T16 and at their lower ends to cathodes C thereof. The primary windings of grid voltage transformers PT1 through PT6 are connected at their upper ends to center taps on the secondary windings of transformers PT11 through PT16, respectively, and at their lower ends to anodes A of control triodes T11 through T16. Thus, the primary winding of each grid voltage transformer PT1 through PT6 is connected across the upper portion of the secondary winding of the associated transformer PT11 through PT16 and the associated resistor R11 through R16, respectively. While six transformers PT11–16 have been shown, it will be apparent that three transformers could be employed in place thereof, each having a pair of secondary windings oppositely connected in the anode circuits of each pair of triodes T11 and T14, T12 and T15 and T13 and T16.

Control network CN' is additionally provided with a three-phase transformer PT20 having three primary windings XP, YP and ZP and three pairs of secondary windings XS, YS and ZS for supplying phase-shifted alternating voltages to grids G of control triodes T11 through T16. Primary windings XP, YP and ZP are connected between lines L3, L1 and L2, respectively, and a common point P to provide phase-shifted alternating voltages to grids G of control triodes PT11–16. Secondary windings XS are connected at one end thereof to a common point S and at their other ends through resistors R21 and R24 to grids G of control triodes T11 and T14, respectively. Secondary windings YS are connected at one end thereof to common point S and at their other ends through resistors R22 and R25 to grid G of control triodes T12 and T15, respectively. Secondary windings ZS are connected at one end thereof to common point S and at their other ends through resistors R23 and R26 to grids G of control triodes T13 and T16, respectively. As a result, the alternating current control voltages supplied to grids G of control triodes T11 through T16 are shifted in phase 90 degrees relative to the anode voltages thereof. A controller CT which may be similar to controller CT of Fig. 1 is connected through conductor 12 to common point S and through conductor 14 in parallel to cathodes C of control triodes T11 through T16 for adjustably controlling the latter.

The operation of the system of Fig. 4 will now be described with reference to the operating characteristics graphically depicted in Figs. 3 and 5. In Fig. 3, waves (A) represent the three phases of the power supply voltage applied through lines L1, L2 and L3 to input terminals 2, 4 and 6 of rectifier network RN'. Waves (B) represent the bias voltages B1–B6 applied to grids G of triodes T1 through T6, respectively, through grid voltage transformers PT1 through PT6 and transformers PT11 through PT16, respectively. Fig. 3(C) is a simplified representation of the alternate negative (rectangle) and positive (space) bias voltages applied to grids G of triodes T1–6 in overlapped time relation for each period of 180 electrical degrees with the triodes not firing. Fig. 3(D) is a simplified representation similar to Fig. 3(C) and additionally including a representation of thirty degree firing sequence of triodes T1–6. The curves A11–16 in Fig. 5(A) represent the voltages applied through transformers PT11–16 to anodes A of control triodes T11–16, respectively. The curves B11 through B16 in Fig. 5(B) represent the alternating current bias voltages applied through transformer PT20 and then through resistors R21 through R26 to grids G of control triodes T11 through T16, respectively. Horizontal axis A1 represents the level of the positive direct current control voltage applied from controller CT across grids G and cathodes C of control triodes T11–16. The direct current control voltage may be selectively adjusted in a manner disclosed in the aforementioned copending application Serial No. 685,599 to advance or retard the firing point of control triodes T11–16, thereby to modify the output of rectifier network RN' and control the speed of motor M.

Let it be assumed that lines L1, L2 and L3 are connected to a suitable three-phase alternating current power supply source. As a result, a three-phase voltage as shown in Fig. 3(A) is applied to input terminals 2, 4 and 6 of rectifier network RN'. During the 180 electrical degree period (0–180°) when line L1 is positive relative to line L2, grid G of triode T1 is biased negative through transformers PT11 and PT1 and resistors R11 and R1. During this same period grid G of triode T4 is biased positive through transformers PT14 and PT4 and resistors R14 and R4. Also during this period, positive voltage is applied to anode A of control triode T11 as shown by curve A11 in Fig. 5(A). Under these conditions, network RN' does not conduct because triode T1 is biased "off" and while triode T4 is biased "on," no current can flow therethrough into line L1 because the latter has a positive voltage thereon. The aforementioned negative bias of triode T1 is shown by wave B1 in Fig. 3(B) and by the rectangle in Fig. 3(C) and (D). The aforementioned positive bias of triode T4 is represented in Fig.

3(B) by wave B4 and in Fig. 3(C) and (D) by the space between the rectangles.

During the 180 electrical degree period (60–240°) when line L1 is positive relative to line L3, grid G of triode T6 is biased negative through transformers PT16 and PT6 and resistors R16 and R6 and grid G of triode T3 is biased positive through transformers PT13 and PT3 and resistors R13 and R3. During the next overlapping 180 electrical degree period (120–300°) when line L2 is positive relative to line L3, grid G of triode T2 is biased negative through transformers PT12 and PT2 and resistors R12 and R2 and grid G of triode T5 is biased positive through transformers PT15 and PT5 and resistors R15 and R5.

Similarly, during the remaining three 180 electrical degree periods (180–360°, 240–420° and 300–480°) in the first complete cycle when line L2 is positive relative to line L1, line L3 is positive relative to line L1 and line L3 is positive relative to line L2, respectively, grids G of triodes T4, T3 and T5 are biased negative and grids G of triodes T1, T6 and T2 are concurrently biased positive, respectively, in the order mentioned as shown in Fig. 3(B) and (C). During each of the aforementioned 180 electrical degree periods, network RN' is prevented from conducting because in each instance one triode of the vertical pair involved is biased "off."

Controlled conduction of network RN' is afforded by control triodes T11–16, the latter being under the control of controller CT. Controller CT may comprise any suitable source of direct current potential which may be adjustably applied to control grids G of control triodes T11–16 in parallel. This direct current potential has superimposed thereon an alternating current bias voltage through transformer PT20. The alternating current bias voltages B11–16 applied from secondary windings XS, YS and ZS of transformer PT20 to grids G of control triodes T11–16 are phase-shifted 90 degrees relative to the anode voltages applied through transformers PT11–16 to the control triodes.

Let it be assumed that controller CT is operated to increase the direct current grid control potential so that grid bias wave B11 intersects the grid characteristics or control locus of control triode T11 at point X1 as shown in Fig. 5(B). Control triode T11 having a positive voltage A11 on its anode A at this time, triode T11 fires. As a result, a steep wave front positive pulse shown by the shaded portion in Fig. 5(A) and similar to pulse F1 shown in Fig. 3(B) is applied from the anode circuit of control triode T11 through transformer PT1 and resistor R1 to grid G of triode T1 during the latter portion of the 180 electrical degree period when triode T1 is biased negative. This firing pulse F1 renders triode T1 conducting and continues to conduct during the remainder of the 180 degree period as shown by the first pulse in Fig. 3(E).

For exemplary purposes, it may be assumed that controller CT is adjusted to control the grids of triodes T11–16 to a value whereby the latter provide a firing pulse, Fig. 5(A), during the last thirty degrees of the negative bias period of each triode T1–6. Referring to Fig. 3(B) and (C), it will be apparent that during the last thirty degrees of the negative bias period B1 of triode T1, both triodes T4 and T5 are positively biased. Hence, triode T1 will conduct with triode T5 because triode T4 is connected to the same line L1 as triode T1 and line L1 has a positive voltage thereon. As a result, current flows through armature ARM of motor M in a circuit extending from line L1 through input terminal 2, triode T1, output terminal 8, armature ARM, output terminal 10, triode T5 and input terminal 5 to line L2 to start the motor.

Referring to Fig. 5(A), the shaded portions indicate the conduction of control triodes T11–16. As shown in Fig. 5(B), triode T11 fires at point X1, T16 at point X2, T12 at point X3, T14 at point X4, T13 at point X5 and T15 at point X6. The resulting output pulses shown shaded in Fig. 5(A) are provided by control triodes T11, T16, T12, T14, T13 and T15 in that order during each cycle of the power supply and this sequence is repeated for each succeeding cycle thereof. These firing pulses are applied to grids G of triodes T1–6 in network RN' to afford a repetitively sequential firing order of triode T1 with T5, T6 with T1, T2 with T6, T4 with T2, T3 with T4 and T5 with T3 similar to the firing order of the system of Fig. 1, shown in Fig. 3(E). The resultant output of network RN' represented by the pulse wave in Fig. 3(E) is applied to armature ARM of motor M to operate the latter.

To adjust the speed of motor M, controller CT is operated through a rheostat or the like to increase or decrease the direct current control potential to the grids of control triodes T11–16. Increase in the control potential effects advances of the steep wave front of the firing pulses thereby to correspondingly advance the firing points of triodes T1–6 and to increase the armature voltage. Conversely, decrease in the control potential to the grids of control triodes T11–16 effects retardation of the wave fronts of the firing pulses thereby to correspondingly retard the firing points of triodes T1–6 and to decrease the applied armature voltage. Hence, the speed of the motor may be selectively adjusted and controlled by operating controller CT.

While control network CN is shown connected for controlling rectifier network RN in Fig. 1, it will be apparent that control network CN of Fig. 1 could as well be employed to control rectifier network RN' of Fig. 4. To this end, secondary windings S1 and S3 of transformer PT1A and secondary windings S21 and S23 of transformer PT2A may be connected to grids G of triodes T1 and T4, respectively, and the remaining secondary windings of these transformers omitted. Likewise, control network CN' of Fig. 4 can readily be modified by adding another secondary winding to each transformer PT1–6 to control rectifier network RN in Fig. 1.

I claim:

1. In a system for transferring electrical energy between a plural-phase alternating current source and a direct current load, in combination, a plural path rectifier network for full-wave transfer of energy from said source to said load and comprising a first group of controllable unidirectional conducting devices connected between said source and said load and a second group of controllable unidirectional conducting devices connected between said load and said source, each of said paths including the load and one unidirectional conducting device of each of said groups, and means for controlling conduction in said paths in repetitively sequential cycles, said controlling means comprising means for electrically biasing said unidirectional conducting devices in a predetermined order, the biasing applied to each unidirectional conducting device comprising alternate application of different voltages, one of said voltages preventing conduction therethrough and the other of said voltages preparing the respective unidirectional conducting device for conduction, and means for applying control signals to said unidirectional conducting devices within the periods when the respective unidirectional conducting devices are biased for non-conduction to initiate conduction therethrough and through a unidirectional conducting device in the other group which is concurrently prepared for conduction to energize the load.

2. The invention defined in claim 1, wherein said predetermined order comprises the biasing of at least one of said unidirectional conducting devices in one of said groups with said one voltage and concurrently biasing at least one of said unidirectional conducting devices in the other group with said other voltage.

3. The invention defined in claim 1, wherein said predetermined order comprises the biasing of succeeding ones of said unidirectional conducting devices in one of said groups with said one voltage and concurrently biasing succeeding ones of said unidirectional conducting devices in the other group with said other voltage.

4. The invention defined in claim 1, wherein said predetermined order comprises sequential and overlapped biasing of succeeding ones of said unidirectional conducting devices in one of said groups alternately with said one and said other voltage and concurrent sequential and overlapped biasing of succeeding ones of said unidirectional conducting devices in said other group alternately with said other and said one voltage, respectively.

5. The invention defined in claim 1, wherein said first group comprises three unidirectional conducting devices 1, 2 and 3 and said second group comprises three unidirectional conducting devices 4, 5 and 6, the respective unidirectional conducting devices of said first group being connected to the respective unidirectional conducting devices of said second group and the respective junctions thereof being connected to the plurality of phases of said source, and said means for applying control signals comprises means for initiating conduction of said unidirectional conducting devices in the order 1, 6, 2, 4, 3 and 5 to establish conducting paths therethrough in series with the load and through unidirectional conducting devices 5, 1, 6, 2, 4 and 3, respectively, during each complete cycle of the plural-phase alternating current source.

6. In a system for transferring electrical energy between a plural phase alternating current source and a direct current load, in combination, a plural path rectifier network for full-wave transfer of energy from said source to said load and comprising a first group of controllable unidirectional conducting devices connected between said source and said load and a second group of controllable unidirectional conducting devices connected between said load and said source, each of said paths including the load and one unidirectional conducting device in each of said groups, and means for controlling conduction in said paths in repetitively sequential cycles, said controlling means comprising means for biasing said unidirectional conducting devices in a predetermined order, said biasing comprising the application of a negative voltage to a unidirectional conducting device in each of said paths during each period of time that the phase of the source to which the respective path is connected has a positive voltage thereby to prevent current flow in said paths, and means for controlling said unidirectional conducting devices by applying control pulses thereto singly in a predetermined order during said negative bias periods thereof to afford a number of output pulses from said network to said load during each complete cycle of said source equal to twice the number of phases in said source.

7. The invention defined in claim 6, wherein said means for controlling said unidirectional conducting devices comprises adjustable means for selectively advancing or retarding said control pulses and the firing points of said unidirectional conducting devices relative to the source voltage to alter the power output from said network to the load.

8. The invention defined in claim 6, wherein each of said unidirectional conducting devices comprises a controlled rectifier of the solid element type having an anode and a cathode connected in one of said paths and a control electrode connected to said controlling means.

9. The invention defined in claim 8, together with an impedance connected in parallel with each controlled rectifier.

10. The invention defined in claim 8, wherein said controlling means further comprises means for controlling the electrode currents of said controlled rectifiers.

11. The invention defined in claim 6, wherein each of said unidirectional conducting devices comprises an electric discharge device having an anode and a cathode connected in one of said paths and a control electrode connected to said controlling means.

12. In a system for transferring electrical energy between an alternating current source and a direct current load, in combination with a plural path rectifier network for full-wave transfer of energy from said source to said load and comprising a first group of controllable unidirectional conducting devices connected between said source and said load and a second group of controllable unidirectional conducting devices corresponding to the devices of said first group connected between said load and said source, the corresponding devices of said groups being respectively connected to one another and at their junctions to said source, each of said paths including said load and at least one unidirectional conducting device of each of said groups, means for biasing said unidirectional conducting devices in a predetermined order, the biasing applied to each unidirectional conducting device comprising alternate application of negative and positive voltage, each application of negative voltage preventing conduction in the associated path and each application of positive voltage rendering the respecting unidirectional conducting device susceptible to conduction without actually initiating conduction in such path, and means for supplying control signals to said unidirectional conducting devices in a predetermined repetitive sequence to render the same conducting to provide a number of output pulses to said load during each cycle of the source voltage equal to twice the number of phases in said source.

13. The invention defined in claim 12, wherein said control signal supplying means comprises a plurality of saturable reactor devices each associated with a corresponding pair of unidirectional conducting devices in said groups, said saturable reactor devices having control windings connected in circuit, and means for adjustably energizing said control windings to modify said control pulses thereby to alter the firing points of said unidirectional conducting devices.

14. The invention defined in claim 12, wherein said control signal supplying means comprises a plurality of electric discharge devices, means for connecting each one of said electric discharge devices to a respective one of said unidirectional conducting devices in said first and second groups to control the same, means including said connecting means for supplying bias voltages from said source to said unidirectional conducting devices, and adjustable means for initiating conduction in said electric discharge devices in a predetermined order.

15. In a control system for supplying the armature winding of a direct current motor from a three-phase alternating current source, in combination, a network having three input terminals connected to the respective phases of said source and two output terminals connected to the motor armature winding, a first group of unidirectional conducting units connected for conduction from the respective ones of said input terminals toward a first one of said output terminals and a second group of unidirectional conducting units connected for conduction from the other output terminal toward the respective ones of said input terminals, said network supplying three-phase full-wave rectified alternating current from said source to said armature winding, means connected to said source for electrically biasing each of said unidirectional conducting units alternately negative and positive through sequential 180 electrical degree periods of the source voltage, the negative bias period of each unidirectional conducting unit in one of said groups coinciding with at least a portion of the positive bias period of a unidirectional conducting unit in the other group which is connected to a different input terminal, and means for applying electrical firing pulses to said unidirectional conducting units in a predetermined cyclic order during a portion of the negative bias period of each unit thereby to initiate conduction through the latter and through the unidirectional conducting unit in the other group having a positive bias to energize the armature winding of the motor.

16. The invention defined in claim 15, wherein said firing pulse applying means comprises means for establishing conduction through each unidirectional conducting unit in said two groups twice during each cycle of the source voltage to afford six output pulses from said network to the armature winding during each such cycle.

17. The invention defined in claim 15, wherein said firing pulse applying means comprises adjustable means for selectively advancing or retarding the wave front of said firing pulses relative to the input voltage of said rectifier network to control the speed of the motor.

18. The invention defined in claim 17, wherein said adjustable means comprises magnetic amplifier means having control windings, and means for adjusting the energization of said control windings.

19. The invention defined in claim 17, wherein said adjustable means comprises a plurality of electric discharge devices for controlling the respective unidirectional conducting units, each of said discharge devices having main electrodes connected to said source and to the respective unidirectional conducting units and a control electrode, a plural-phase translating device for supplying alternating current control voltages to said control electrodes in a predetermined order, the control voltage supplied to each control electrode having a predetermined phase displacement relative to the main electrode voltage of the corresponding discharge device, and adjustable direct current means connected through said translating device to said control electrodes for controlling operation of said discharge devices.

20. The invention defined in claim 15, wherein each of said unidirectional conducting units comprises a plurality of controlled rectifiers of the solid element type and an uncontrolled rectifier connected in series between an input terminal and an output terminal of said network, said controlled rectifiers each having an anode and a cathode in said series connection and a current controlled gate electrode connected to said biasing and firing pulse applying means.

21. The invention defined in claim 20, together with a resistor connected across each of said controlled rectifiers.

References Cited in the file of this patent
UNITED STATES PATENTS

| | | |
|---|---|---|
| 2,259,118 | Stoehr | Oct. 14, 1941 |
| 2,315,619 | Hutcheson et al. | Apr. 6, 1943 |
| 2,728,887 | Rockafellow | Dec. 27, 1955 |
| 2,753,506 | Elliot | July 3, 1956 |
| 2,859,399 | Sommeria | Nov. 4, 1958 |
| 2,899,627 | Steinberg | Aug. 11, 1959 |